United States Patent [19]

Reschke et al.

[11] Patent Number: 5,490,250
[45] Date of Patent: Feb. 6, 1996

[54] METHOD AND APPARATUS FOR TRANSFERRING INDICATION OF CONTROL ERROR INTO DATA PATH OF DATA SWITCHER

[75] Inventors: Klaus P. Reschke, San Mateo; Gary S. Goldman, San Jose, both of Calif.

[73] Assignee: Amdahl Corporation, Sunnyvale, Calif.

[21] Appl. No.: 816,884

[22] Filed: Dec. 31, 1991

[51] Int. Cl.⁶ .................................................. G06F 11/34
[52] U.S. Cl. ............................. 375/185.01; 371/68.2
[58] Field of Search ............................ 371/29.1, 5.1, 371/16.1, 19, 32, 33, 48, 67.1, 68.1, 68.2; 340/825, 825.16, 825.17; 395/575; 370/28, 85.13, 94.1

[56] References Cited

U.S. PATENT DOCUMENTS

| | | |
|---|---|---|
| 3,956,589 | 5/1976 | Weathers et al. . |
| 4,453,213 | 6/1984 | Romagosa ........................... 371/16.1 |
| 4,490,817 | 12/1984 | Turner ................................. 371/5.1 |
| 4,596,014 | 6/1986 | Holeman . |
| 4,661,953 | 4/1987 | Venkatesh et al. ................... 371/16.1 |
| 4,679,195 | 7/1987 | Jewey ................................. 371/29.1 |
| 4,837,640 | 6/1989 | Ozaki et al. . |
| 4,862,461 | 8/1989 | Blaner ................................. 371/33 |
| 4,909,828 | 3/1990 | Tikalsky ............................. 371/32 |
| 4,970,714 | 11/1990 | Chen et al. ......................... 371/32 |
| 5,027,356 | 6/1991 | Nakamura et al. ................. 371/32 |
| 5,084,877 | 1/1992 | Netravali et al. .................. 371/32 |
| 5,088,091 | 2/1992 | Schroeder et al. ................. 370/94.3 |
| 5,168,497 | 12/1992 | Ozaki et al. ....................... 371/33 |
| 5,210,751 | 5/1993 | Onoe et al. ........................ 371/32 |
| 5,220,567 | 6/1993 | Dooley et al. ..................... 371/5.1 |
| 5,371,731 | 12/1994 | Pratt et al. ......................... 371/32 |

OTHER PUBLICATIONS

ProNet "DNX 300m Bridging Router" Proteon.
Proteon "CNX 400 and CNX 500 Routers".
Proteon "RBX 200 Remote Branch Router".
Tracy T. Bradley "Performance of error recovery schemes in a fast packet switching network" pp. 483–488 1990 IEEE.

Primary Examiner—Robert W. Beausoliel, Jr.
Assistant Examiner—Albert Década
Attorney, Agent, or Firm—Fliesler, Dubb, Meyer & Lovejoy

[57] ABSTRACT

The invention provides a method and apparatus for tagging a control error indication onto a data signal passing through a data router in a computer system.

14 Claims, 6 Drawing Sheets

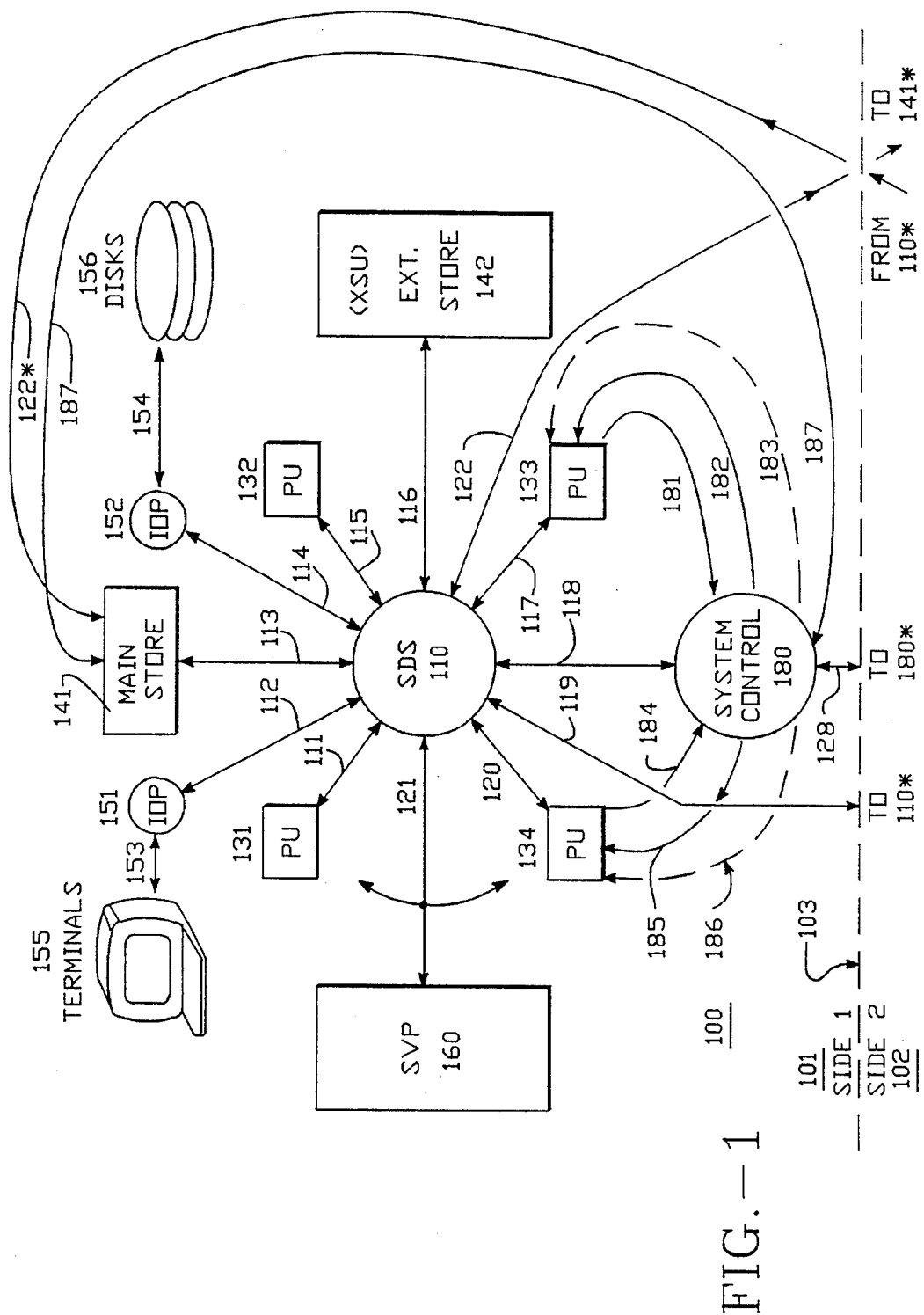
FIG. —1

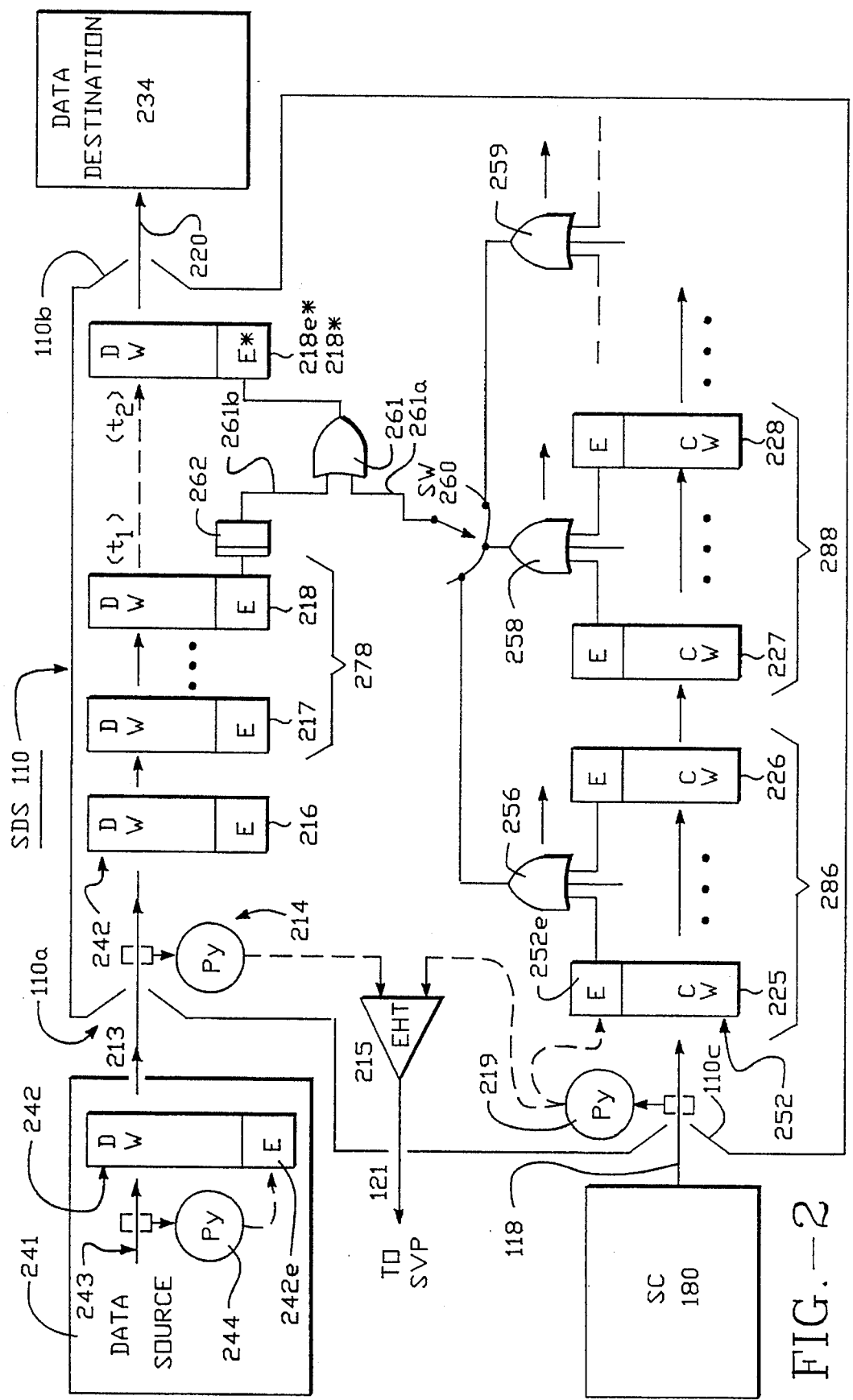

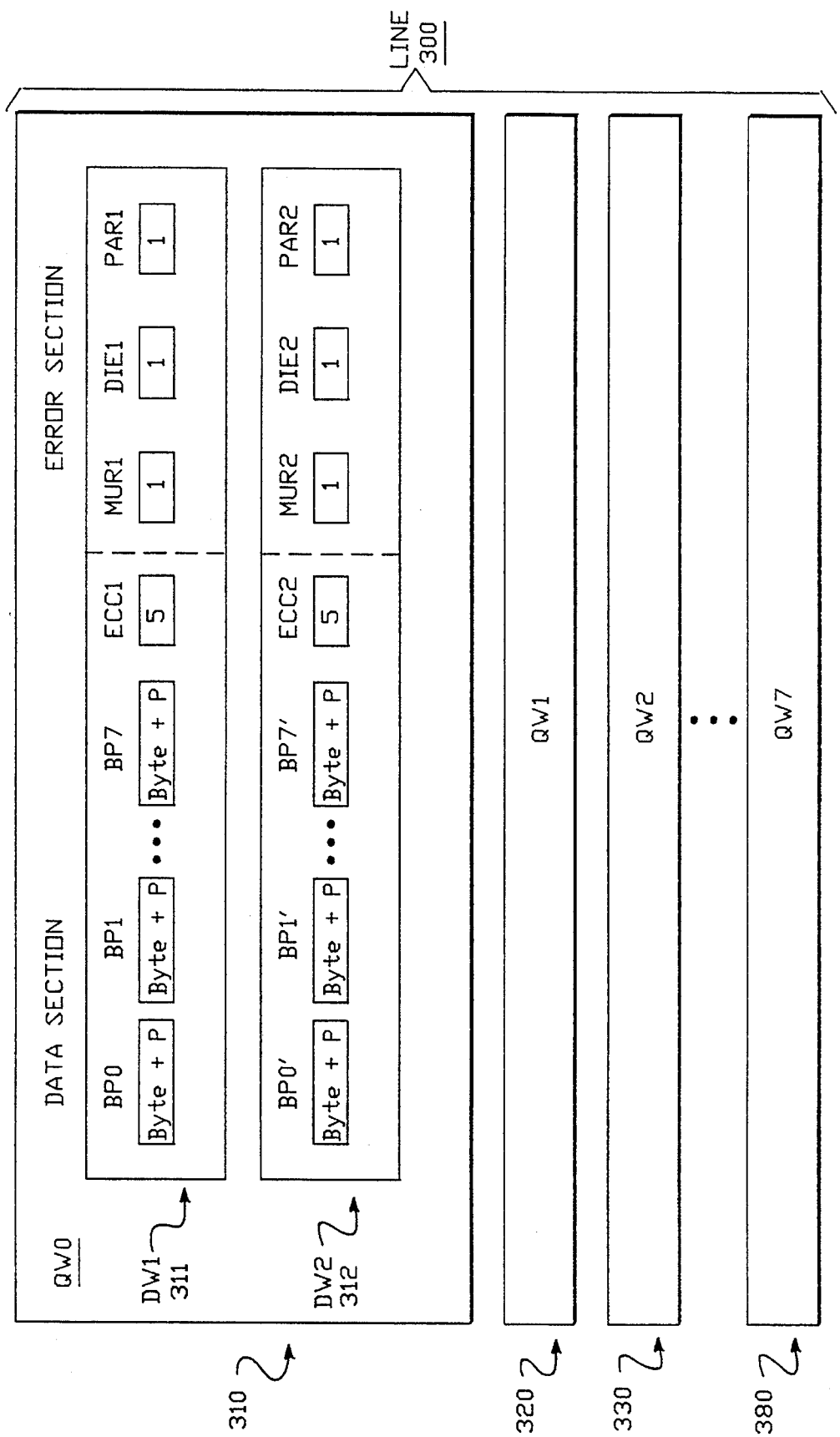

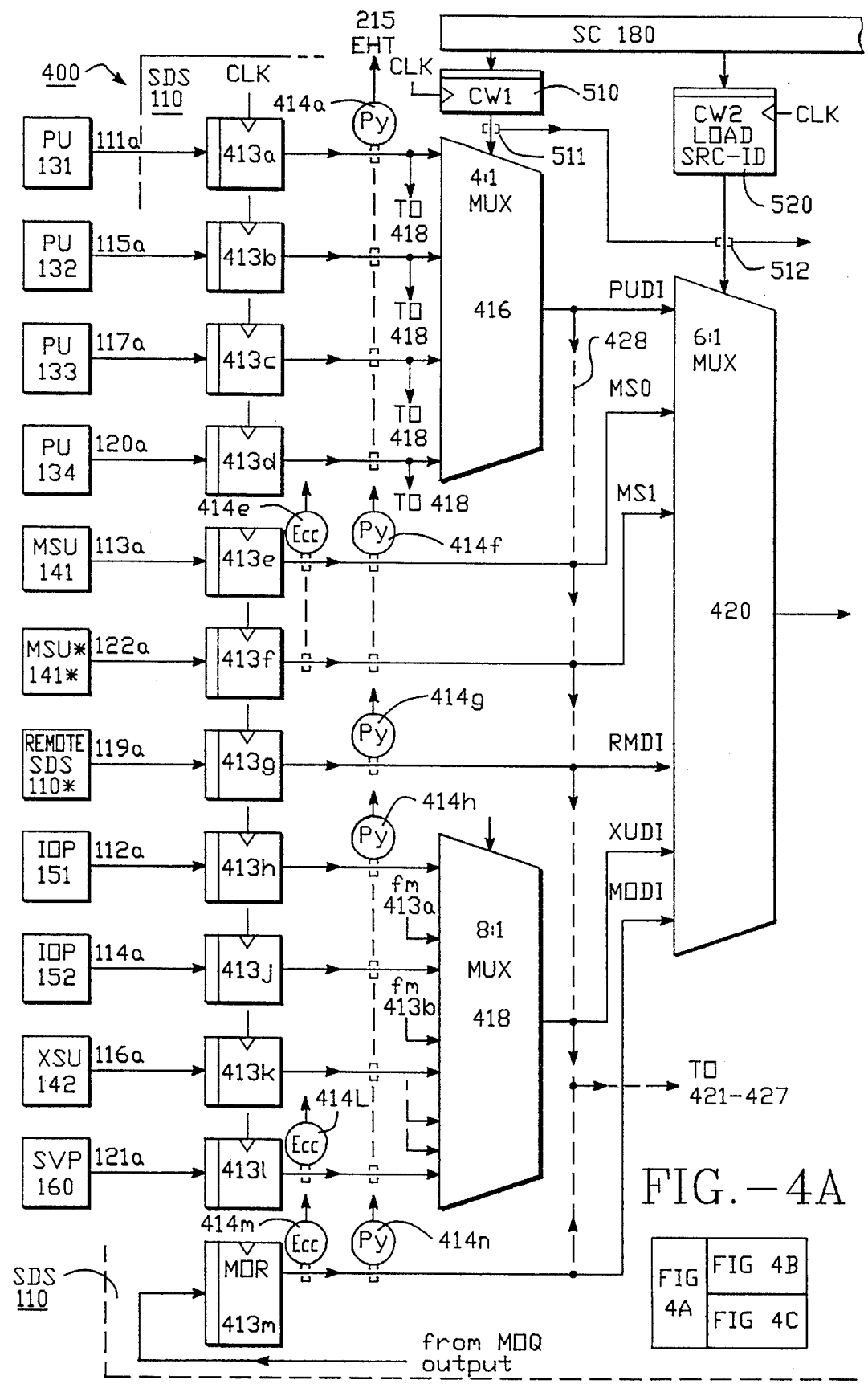
FIG.—4A

METHOD AND APPARATUS FOR TRANSFERRING INDICATION OF CONTROL ERROR INTO DATA PATH OF DATA SWITCHER

BACKGROUND

1. Field of the Invention

The invention relates generally to computer systems. The invention relates more specifically to a method and apparatus for handling error conditions in a digital computer whose data moves through a data switching unit.

2a. Cross Reference to Related Applications

The following copending U.S. patent application(s) is/are assigned to the assignee of the present application, is/are related to the present application and its/their disclosure(s) is/are incorporated herein by reference:

(A) Ser. No. 07/670,289 entitled "SCANNABLE SYSTEM WITH ADDRESSABLE SCAN RESET GROUPS", by Robert Edwards et al, which was filed Mar. 15, 1991 [Atty. Docket No. AMDH7954];

(B) Ser. No. 07/813,891 filed Dec. 23, 1991 by Christopher Y. Satterlee et al, and entitled, IMPROVED METHOD AND APPARATUS FOR LOCATING SOURCE OF ERROR IN HIGH-SPEED SYNCHRONOUS SYSTEMS [Attorney Docket No. AMDH7952];

2b. Cross Reference to Related Patents

The following U.S. Patents are assigned to the assignee of the present application and are further incorporated herein by reference:

(A) U.S. Pat. No. 3,840,861, DATA PROCESSING SYSTEM HAVING AN INSTRUCTION PIPELINE FOR CONCURRENTLY PROCESSING A PLURALITY OF INSTRUCTIONS, issued to Amdahl et al, Oct. 8, 1974;

(B) PROGRAM EVENT RECORDER AND DATA PROCESSING SYSTEM, U.S. Pat. No. 3,931,611, issued to Grant et al, Jan. 6, 1976;

(C) U.S. Pat. No. 4,244,019, DATA PROCESSING SYSTEM INCLUDING A PROGRAM-EXECUTING SECONDARY SYSTEM CONTROLLING A PROGRAM-EXECUTING PRIMARY SYSTEM, issued to Anderson et al, Jan. 6, 1981;

(D) U.S. Pat. No. 4,661,953, ERROR TRACKING APPARATUS IN A DATA PROCESSING SYSTEM, issued to Venkatesh et al, Apr. 28, 1987;

(E) U.S. Pat. No. 4,679,195, ERROR TRACKING APPARATUS IN A DATA PROCESSING SYSTEM, issued to Dewey, Jul. 7, 1987;

(F) U.S. Pat. No. 4,685,058, TWO-STAGE PIPELINED EXECUTION UNIT AND CONTROL STORES, issued to Lee et al, Aug. 4, 1987;

(G) U.S. Pat. No. 4,752,907, INTEGRATED CIRCUIT SCANNING APPARATUS HAVING SCANNING DATA LINES FOR CONNECTING SELECTED DATA LOCATIONS TO AN I/O TERMINAL, issued to Si, et al. Jun. 21, 1988;

(H) U.S. Pat. No. 4,819,166, MULTI-MODE SCAN APPARATUS, issued to Si et al. Apr. 4, 1989.

3. Description of the Related Art

When an error occurs somewhere within a high-speed digital computer, it takes a finite amount of time to: (1) detect the error, (2) set an error flag at the point of detection, (3) transmit a message to a central control unit indicating that the error has occurred, (4) determine how to handle the error condition, and (5) transmit control signals from the central control unit to affected parts of the computer informing them of the error condition and directing them to take corrective action.

It is advantageous to complete all of the above steps (1)–(5), and particularly steps (4) and (5), as quickly as possible so that corrective action can take place in the error-infected parts of the computer as soon as possible. Preferably, correction in the error-infected parts should complete without slowing down operations in non-infected parts of the computer system.

A unique set of problems develop when the computer includes a central data-routing unit (e.g. a crossbar data router). Such a unit routes data selectively between data-possessing parts of the computer (data sources) and data-needing parts of the computer (data destinations). Typically, the router unit operates under the command of a central control unit.

If an error condition arises in a control path of the data-routing unit, data might be fetched from the wrong source, or delivered to a wrong destination, or it might become lost in the router and never delivered to any destination, and/or the control error may damage existing data then being transferred through the data-routing unit to a different destination.

The central control unit of the computer is conventionally charged with the task of coordinating recovery activities when an error condition is detected in one or more control signals of the routing unit.

The central control unit has to determine where each error-infected control signal is located within the router or a related component. It has to decide which of the numerous data source and destination parts of the computer are to have their most recent operations nullified because of the error. And it has to determine which specific blocks of data in the router or data destinations are infected by the error. The central control unit then has to direct the affected destination points to discard error-corrupted portions of the data they received from the router, and it has to also direct the corresponding data sources to retransmit such data through the router to the intended destinations.

The router control signals which could be infected with errors typically include some or all of the signals named in the following, non-exhaustive listing:

(1) Data-request signals sent from data-needing parts of the computer to indicate that the requesters are ready for or need new data;

(2) Source address/size signals for identifying the source of the requested data (the data-possessing part which is to send the data) and the number of data bits to be sent;

(3) Source sequence signals for indicating the sequence in which source data items will be delivered to the router (e.g., by numerical sequence or alphabetic sequence or some other sequence);

(4) Source delivery-complete signals for indicating when delivery of data to the router from each source is complete;

(5) Intermediate routing signals for identifying an intermediate route through the router which source data will take as it travels downstream from a source point to a destination point;

(6) Destination address signals for identifying the destination point or points to which each block of source data will be sent (for identifying each data-needing part that will receive the routed data);

(7) Destination sequence signals for indicating the sequence in which data items will be delivered from the router to each destination point; and (8) Destination delivery-complete signals for indicating when delivery of data from the router to a destination point is complete.

Conventionally, when an error condition is detected in one of the control signals of the router, the central control of the computer coordinates error recovery activities by:

(a) First inspecting destination address signals held in the router to determine which destination points were to receive the error-corrupted data;

(b) Secondly, inspecting source address signals which are also held within the router to determine the size or extent of data corrupted by the error condition and to identify the source from which the error-corrupted data came;

(c) Thirdly, determining the extent of damage and figuring out how to handle the particular error condition;

(d) Fourthly, routing error-reporting signals to the affected destination points over a set of control paths (which control paths are provided separately from data routing paths) to thereby warn the destination points that recently received data is suspect and should be discarded; and (e) Fifthly, routing error-recovery signals (retry commands) to the affected source points over a set of control paths (which are provided separately from the data routing paths) to thereby instruct the source points to halt transmission of the error-corrupted block if not yet completed and retransmit the data starting with the part which the destination points have been instructed to discard.

There are several drawbacks to this approach.

A first drawback is that an excessive amount of time may be consumed by the (a) step of determining which destination points are to be informed.

A second drawback arises from the characteristics of data flow in high speed computers and takes a little more to explain. Signals are continuously flowing from one part to the next. By the time an error condition is detected and acted upon, destination address signals will have already moved downstream, from a source point into an interior part of the router. Often, the address signals are at that time held exclusively in the router. It may take the central control unit a substantial amount of time to retrieve them out of the router. While this is disadvantageous in itself, it should be recognized that even when they are finally retrieved, the destination address signals may be of little value if a problem resides within address carrying circuits of the router that are located downstream of the point from which the destination address signals were retrieved. If the more downstream version of the address signals (e.g., those flowing closer to the destination end of the router) are corrupted by an error condition (e.g. by line noise), the retrieved upstream version of the destination address signals may fail to correctly point to the downstream destination which actually receives the data.

A third drawback of the above approach is that an excessive amount of wiring might be required for supporting above steps (c), (d) and (e). Because special wires extend from the central control unit for determining the extent of damage in other parts of the machine, for sending error reporting signals to the destination points and for sending retry signals to corresponding source points, the number of wires grows as the number of source, destination and intermediate points in the system grows.

Also, because it takes time to determine the extent of damage and/or because wire lengths are not always the same, it may take more time for error-reporting signals to reach all the affected destination points than it does for the initial error-corrupted data to move completely out of a source unit and completely into a destination unit. If data runs ahead of error reports, the computer is burdened with the job of correcting a wider propagation of erroneous data. The data source continues to transmit new blocks of data until it is commanded to stop and retry from an earlier point. The data destination unit (which unit is not necessarily the desired destination point) continues to receive and perhaps act on the error-infected data until it is told to stop. After source and destination units halt their respective error-affected activities, the computer's central control has to determine for each separately-transmitted or received item of data whether it is affected by the error condition and it then has to indicate in some way that the item of data is part of an error-infected block.

A fourth drawback of the above approach is that operations may have to be halted for excessively long time periods throughout the computer, even in parts not affected by the error.

A fifth drawback is that system size and costs increase substantially when upward scaling of the system is carried out. In such scaling, the computational capabilities of the system are enhanced by increasing the number of source/destination points tied to the router. This inherently increases the number of wires needed for separately transmitting error-reports/retry-commands to destination/source points in the case of a control error. As the number of service ports on the router is increased, additional wires have to be added between the router and the central control for enabling the central control to inspect the conditions at the additional service ports when an error condition is detected. Also, system speed decreases with upward scaling because, as the number of source/destination points increases, the central control unit is burdened more and more with the job of overseeing recovery activities in an increasing number of source and destination points.

A better approach is needed.

SUMMARY OF THE INVENTION

In accordance with the invention, the above-mentioned problems are overcome by providing a method and apparatus for embedding an indication of a control error directly into the data paths which carry error-affected data. The error indication is preferably tagged onto each affected item of data and it is thereby inherently routed together with the data item to the designated destination point irrespective of whether that destination point is the desired destination or not.

Each destination point is charged with the task of requesting retransmission when routed data is received with an error indication tagged onto it.

One benefit of this approach is that special hardware is no longer needed for separately routing error reports to each of plural destination points. Costs for error handling are thus reduced.

Another benefit is that it is no longer necessary to determine what the destination points are for each item of error-infected data. The error reports automatically reach the affected destination points by riding on the back of the error infected data.

Also, because an error indication is preferably tagged onto each item of routed data (e.g., each dataword), the error indication inherently defines the size or extent of the corrupted data. Moreover, because error reports arrive at the destinations in unison with the routed data, corrective action can be taken in less time than would have been necessary if error reports were sent to destinations after the data arrived. An added benefit is that system performance is not degraded in any substantial way by the use of the tagged-on error indicator.

A structure in accordance with the invention comprises: (a) a plurality of error detectors disposed among control signal paths of a data router, the detectors being provided for detecting error conditions in control signals carried by such paths; (b) tag means for tagging on an indication of a control error condition onto each item of data passing through the router and (c) error-infection extent-defining means for defining which items of data will or will not be tagged with an error indication.

A method in accordance with the invention comprises: (a) providing a plurality of error detectors disposed among control signal paths of a data router for detecting error conditions in control signals carried by such paths; (b) identifying which items of data passing through the router are or are not to be tagged as error-infected when an error condition is detected; and (c) tagging each identified data item with an indication of a control error condition as the identified data item passes through the router.

BRIEF DESCRIPTION OF THE DRAWINGS

The below detailed description makes reference to the accompaning drawings, in which:

FIG. 1 is a block diagram of a computer system in accordance with the invention.

FIG. 2 is a simplified data flow chart showing how a control error indication is transferred from each control word to a corresponding set of routed datawords.

FIG. 3 shows the structure of a block of data which may be transferred through the system data switch (SDS) of FIG. 1.

FIG. 4A–4C is a schematic diagram illustrating an error tagging circuit which may be employed in the system data switch (SDS) of FIG. 1.

DETAILED DESCRIPTION

Figure 4B:
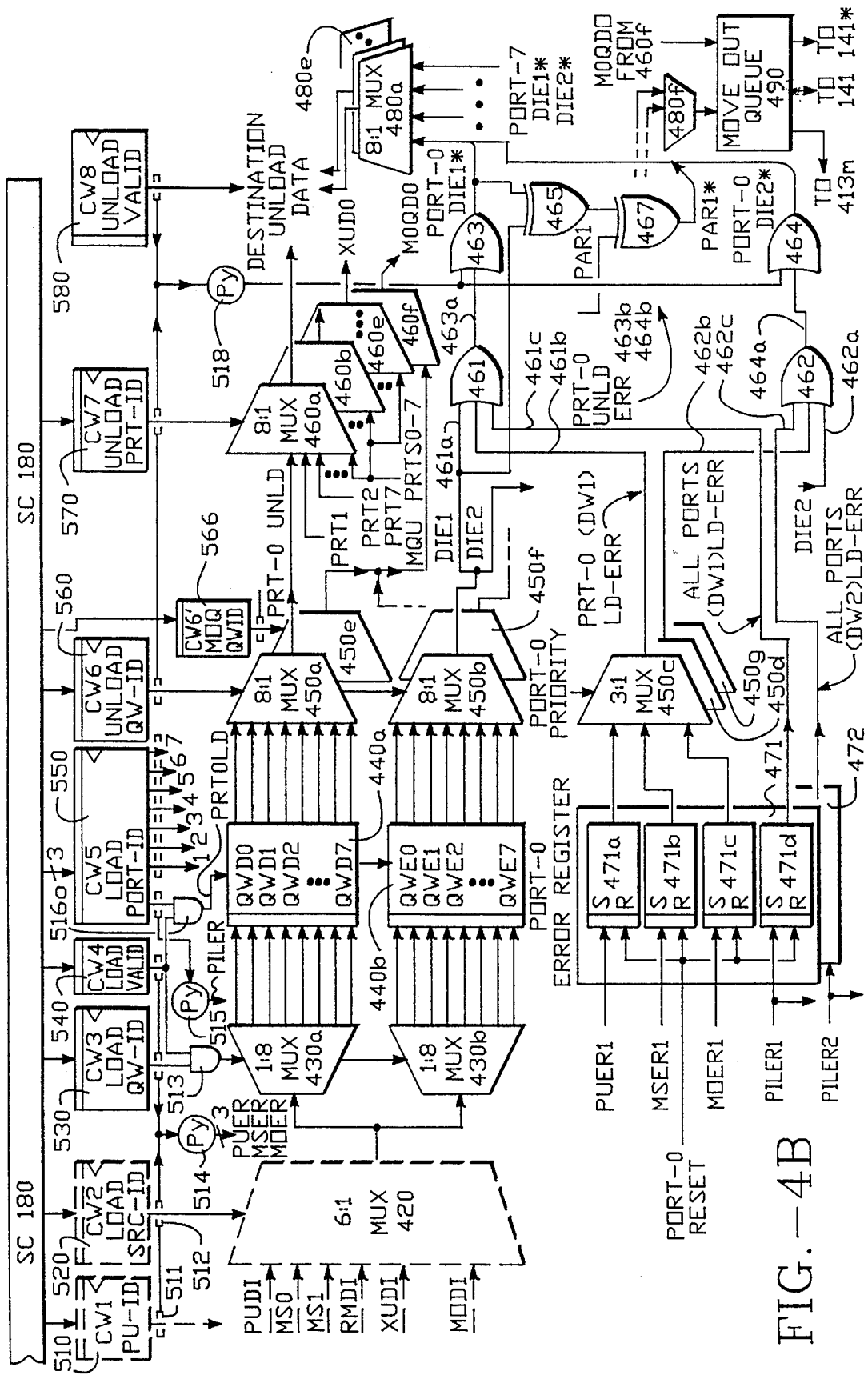

FIG. 1 is a block diagram of a computer system 100 in accordance with the invention.

Computer system 100 can be single-sided or double-sided. Only one side 101 is illustrated. When the system is double-sided, a second side 102 is provided as a mirror image duplicate of the first side 101 with dashed line 103 representing the axis of mirror symmetry. Components in the mirror image side 102 are referenced by adding an asterisk suffix (*) to the reference symbols of components in the first side 101.

A system data switch (SDS) 110 is centrally provided in the first side 101 of the system for routing data signals from and to various components of the first side 101 and also from/to a twin SDS unit (110*, not shown) in the second side 102, and also from/to a second-side mainstore unit (MSU 141*, not shown).

Included among the components of the first side 101 are four data processor units (PU's) 131–134. The four PU's respectively couple to the SDS 110 by way of four data buses, 111, 115, 117 and 120. Each PU (131–134) includes an internal cache memory (not shown) for storing data that is to be or was processed by that PU.

A main storage unit (MSU) 141 is provided for storing centrally accessible data in SRAM (Static Random Access Memory). The MSU 141 couples to SDS 110 by way of data bus 113. Bus 113 carries data signals moving between the MSU 141 and the SDS 110. A separate bus 187 carries control signals between the MSU 141 and a central system control unit (SC) 180 as will be explained shortly.

Additionally, the main storage unit (MSU) 141 couples to the second-side control unit (SC*) 180* by way of data bus 122*. Similarly, the first-side SDS 110 couples to the second-side MSU* (141*) by way of data bus 122.

An extended-storage unit (XSU) 142 composed of DRAM devices (Dynamic Random Access Memory) may be optionally provided and coupled to the SDS 110 by way of data bus 116. A separate control signal carrying bus is provided between XSU 142 and SC 180, but is not shown for the sake of maintaining illustrative clarity.

Two Input/Output processors (IOP's) 151 and 152 are provided in the first side 101 for interfacing with external data terminals 155 or external storage devices (e.g. disks 156). IOP's 151 and 152 respectively couple to the SDS 110 by way of data buses 112 and 114. IOP's 151 and 152 further couple by way of respective buses 153 and 154 (and additional interface means, not shown) to data terminals 155 and disks 156. Again, separate control signal carrying buses are provided for carrying control signals between the IOP's 151, 152 and the SC 180, but these are left out of FIG. 1 in order to avoid illustrative clutter.

In addition to these components, an independently-powered and independently-clocked system-service-processor (SVP) 160 is provided for managing error recovery/repair functions. The SVP 160 couples to the SDS 110 and to all other parts of the computer system 100 by way of a system-wide scan bus 121. Although the scan bus 121 extends throughout system 100, only its connection to the SDS 110 is shown. This is done, again, to avoid illustrative clutter in FIG. 1.

As seen, the system control unit (SC) 180 is provided separately from the SDS 110 (e.g., on a separate printed circuit board). The SC 180 is used for receiving data-needed requests from data-requesting components of the first side 101 (or second side 102), for receiving data-ready indications from data-providing components of the system 100, for keeping track of resource availabilities within the SDS 110, for prioritizing the servicing of data-needed requests or data-ready indications presented within side 101 and for directing the SDS 110 to service the requests/indications according to such prioritizations.

The SC 180 couples to the SDS 110 by way of control bus 118. SC 180 further connects by way of remote extension bus 128 to its twin system control unit (180*, not shown) in side number two (102) when a multi-sided configuration is used (optional). Similarly, data extension bus 119 connects SDS 110 to its twin system data switch (110*, not shown) in side number two (102) when a multi-sided configuration is employed.

As a general rule, requests for data transfer move along separate control buses from each data-needing part of computer system 100 to the system control unit 180 and then, after they are prioritized, they move over control bus 118 to the SDS 110. For the sake of illustrative brevity, only the request control lines (181–187) which extend from the MSU 141 and the third and fourth processor units (PU's), 133 and 134, to the system controller 180 are shown.

Assume that third PU 133 wishes to fetch a block of data and the SC 180 determines that the requested data resides in the main storage unit (MSU) 141. Processor unit 133 sends a request for data over its corresponding control bus 181 to system controller 180. Assume that at the same time, fourth PU 134 wishes to send a block of data into main storage and the SC 180 determines that the block should be sent to the first-side MSU 141. PU 134 sends its request over line 184 into the SC 180.

The system controller 180 prioritizes the requests arriving on lines 181 and 184 with other requests arriving on other lines (not shown) from the other units in the system (131, 132, 151, 152, 160) and from side 102 over bus 128.

Control path 118 carries various control signals of the type earlier mentioned (e.g., source address, destination address, receipt/deliver sequences, etc.). These control signals move between the SC 180 and SDS 110. Included in these signals would be source address signals for identifying an area in the main store unit 141 as the source of the data requested by PU 133. Also included would be load/unload sequencing signals for defining the sequence in which data blocks will be fetched from main storage unit 141 and unloaded into the requesting processor unit, 133, and intermediate/destination routing signals for defining a routing path from main storage unit 141 through SDS 110 to the requesting processor unit 133.

When a data transfer through the SDS 110 completes, the system control unit 180 sends a status valid signal over bus 182 to the requesting unit (PU 133) indicating that valid data now resides within an internal storage unit (cache, not shown) of PU 133. (Or for the case of PU 134, the SC 180 might send a status valid signal over bus 185 to indicate to PU 134 that its data has been successfully stored into MSU 141.)

It is seen that even when system 100 is operating in an error-free state, each processor unit has to wait a certain amount of time for the system control unit 180 to service its data-transfer requests, for the SDS 110 to transfer data from/to a source/destination point (e.g., into/out of the PU's internal cache), and for the system control unit 180 to send status signals indicating that the transfer has completed.

If an error occurs during the transfer of data from a data source to the SDS 110, or within the SDS, or during the transfer of data from the SDS 110 to a destination point, each affected one of the data-receiving units should be informed of the fact and it should be instructed to disregard some or all of the data just transferred to it. Each affected one of the data-providing units should then be instructed to retransmit the disregarded data.

Traditionally, the system control unit 180 would have sent such instructions over separate control lines 183, 186, etc. to respective ones of the destination and source units, as necessary. This type of error reporting is disadvantageous for the reasons already mentioned above. Particularly for the case where PU 133 is requesting data transfer through SDS 110, note that under the traditional approach, when an error occurs within SDS 110, the error indication would first travel from SDS 110 over bus 118 to SC 180 and then over line 183 to PU 133.

But this traditional approach is generally not followed within computer system 100. Lines 183 and 186 are drawn as dashed lines in FIG. 1 to indicate that they do not actually exist within computer system 100. Instead, an error-indication transfer means is provided within the SDS 110 for embedding error-indications into the data transferred over all its data buses (e.g., 111 through 117, 119 through 122).

The error indication moves together with the its corresponding data directly to the data-requesting unit (e.g., PU 133). An error indication related to the PU 133 transfer, for example, does not have to travel from SDS 110, through bus 118, through SC 180 and through nonexistent bus 183 to get to requestor 133. Instead, it travels together with data from SDS 110, over line 117 to destination PU 133.

FIG. 2 shows in broad terms how error indications are transferred from the control paths within the system control unit (SC) 180 to the data paths of SDS 110.

A generic data source is shown at the top left of FIG. 2 and labelled 241. A generic data destination is shown at the top right of FIG. 2 and labelled 234. Data source 241 can represent the MSU 141, or the XSU 142, or a cache memory within a PU, or any other unit of system 100 which transfers data through SDS 110 to a data destination. Similarly, data destination 234 can represent PU 133 or PU 134 or any other unit of system 100 which is to receive data from SDS 110.

During a data transfer, data source 241 continuously pumps datawords (DW) 242 over data bus 213 into an upstream, data-received port 100*a* of SDS 110.

A first parity (Py) or other error detector 244 is positioned within data source 241 and coupled to a data bus 243 extending inside of data source 241 for detecting error conditions in datawords (DW) 242 as they flow from within source 244 to external data bus 213. A bit position 242*e* (E) is reserved within each DW signal 242 for indicating that an error exists in the DW signal 242. The square brackets surrounding bus 243 and coupling to error detector 244 incidentally, indicate that detector 244 checks for data error conditions (e.g., parity errors) in signals flowing through the bracketed bus 243. If the first error detector 244 determines that an error condition exists in a DW signal 242 traveling on bus 243, the detector 244 sets the error bit (E) 242*e* of the corresponding DW signal 242 to a logic one ("1"). Otherwise, it leaves the error bit 242*e* in the reset (logic zero, "0") state.

A second parity (Py) or other error detector/corrector 214 is positioned within the SDS, at the data-receiving end 100*a* of bus 213 for detecting error conditions in received datawords (DW). Optionally, detector 214 is an ECC type corrector rather than merely a parity detector. An ECC type corrector detects error conditions and also automatically corrects certain types of correctable errors within the received datawords using error correction code (ECC) techniques. Regardless of whether detector 214 does or does not automatically correct each received DW signal 242, the second error detector 214 reports discovered error conditions to an error history tree (EHT) portion 215 of the computer (not shown in detail). The error history tree 215 then forwards the error condition report to the SVP 160. The internal structure of the EHT 215 is disclosed in the above-cited application of Satterlee, et al., which application is incorporated herein by reference. Detector 214 does not alter the error bit position 242*e* of DW signals passing through its checkpoint (past input port 100*a*).

At any given time, a number of different DW signals, 216, 217, ..., 218 can be simulta-neously marching through the SDS 110 as they move from an input port (100*a* is one of plural input ports) towards one or different data destination units (e.g., data destination unit 234). For reasons that will be come apparent shortly, a subset, 217, ..., 218, of these different DW signals is labelled 278.

While each data source (241 is one of plural sources) is continuously pumping datawords 242 into SDS 110, the system control unit 180 is simultaneously pumping control words (CW) 252 over control bus 118 into another, control-receiving port 110c of SDS 110. A third parity (Py) or other error detector/corrector 219 is positioned at SDS port 110c for detecting error conditions in received control words 252. An error bit (E) 252e is provided for each control word (CW) 252 and set when error detector 219 detects an error in the corresponding control word 252. Otherwise, the error bit 252e is left in a normally reset state. If error detector 219 detects an error, it also sends an error report to the error history tree 215.

A number of different control words, 225, . . . , 226, 227, . . . , 228, etc. can be simultaneously marching through the SDS 110 in a downstream direction as corresponding datawords (DW) 242 march downstream from one or many different data sources (241) to one or many different data destinations (234).

Each subset (e.g., 278) of datawords (DW) which is flowing downstream through the data paths of SDS 110 has a corresponding subset (e.g., 288) of control words (CW) associated with it. In the illustrated example of FIG. 2, the subset 288 of control words (CW) 227, . . . , 228 is associated with the subset 278 of datawords (DW) 217, . . . , 218 while control word subset 286 is associated with a different subset of datawords (DW), e.g., the subset including DW signal 216.

An OR function unit 258 is provided for collecting the error condition indicators (E) 252e of all control words in subset 288 and outputting a signal representing the logical OR of the subset 288 E bits. OR function unit 258 can be visualized as moving downstream through SDS 110 such that OR unit 258 is continuously in contact with its corresponding subset 288 of control words (CW's) while any of these CW's remain within SDS 110. Another OR function unit 256 is further provided for collecting the error condition indicators (E) 252e of all control words in subset 286 and outputting a signal representing the logic OR of these E bits. It can be pictured as traveling with its corresponding CW's. Yet another OR function unit 259 is provided for collecting the error condition indicators (E) of control words in yet another subset (not shown). Conceptually speaking, when a new subset of control words 252 begin to enter the SDS 110, an unused OR function unit (e.g., 259) joins them in their travel through SDS 110.

A phase alignment switch 260 is provided for selecting the output of one of the OR function units 256–259 and presenting the selected output to a first input 261a of an error-indication combining OR gate 261. In the illustrated example, switch 260 is shown coupling the output of OR function 258 to input 261a of OR gate 261 just as the datawords (DW) belonging to dataword subset 278 pass by the input of a temporary storage latch 262. The output of latch 262 couples to a second input 261b of OR gate 261. Latch 262 temporarily saves the state of each E bit 242e as respective datawords 218, . . . , 217 march by the latch 262 in the recited order, 218 passing by first and 217 passing by last.

As the corresponding datawords next appear near the output of OR gate 261, OR gate 261 overwrites the bit positions of these words with a modified error bit (E*) which is the logical OR of control error indications received from switch 260 and dataword error indications received from latch 262.

FIG. 2 shows this operation occurring for the case of DW signal 218. At a first point in time ($t_1$), the E bit of DW signal 218 is stored in latch 262. At a second point in time ($t_2$), the same bit position which is now referenced as 218e*, receives the output of OR gate 261. Since the DW signal is revised by the output of OR gate 261, it is now referenced as revised dataword 218*. As the revised DW signal 218* moves out of SDS output port 110b and along data bus 220 to data destination unit 234, a next dataword signal 242 within subset 278 presents its E bit position first for storage in latch 262 and thereafter for revision by the output of OR gate 261. This continues for all datawords of subset 278.

When the last DW signal 217 of subset 278 passes by the input of latch 262, the phase alignment switch 260 shifts to receive the output of the next OR function means 256. The logical OR of the E bits in control subset 286 is presented to input 261a of OR gate 261 before, or just as, the E bit of the next DW signal 216 is presented to input 261b of OR gate 261.

When a data destination unit 234 receives the revised datawords 218*, . . . , 217* which are routed out of SDS 110 to it, it inspects their respective modified error indicator positions (E*) 218e*, . . . , 217e* for indications of error. If an error indication is detected, the data destination unit 234 discards the error-infected data and, if it had previously requested data, it sends a new data request (e.g., over a control bus such as 181 in FIG. 1) to the system control unit (SC) 180 requesting retransmission of the data it had earlier requested.

The advantage of this arrangement should now be apparent. When detector 219 detects an error condition downstream of control-receiving port 110c, the SDS 110 does not have to send an error condition report back to system controller 180 (e.g., by way of non-existent bus 183). The data destination unit 234 does not have to wait for system controller 180 to afterwards relay the error report to it (to the data destination unit). SDS 110 reports the error condition directly to the data destination unit 234 by attaching the revised error condition bit E* onto each DW signal that routes to the destination unit 234. The SC 180 does not have to determine which error corrupted dataword went where. Complexity is avoided and time is saved.

Referring to FIG. 3, a particular embodiment in accordance with the invention will now be described in more detail.

When the SDS 110 of this particular embodiment transfers data from the main storage unit 141 or another data-possessing unit (see also FIG. 1) to a requestor, the SDS 110 usually transfers the data in the form of large blocks rather than one dataword (DW) at a time. The size of a transfer block can vary depending on the identity of the source and destination. The largest transfer block of data is referred to as a "line". The smallest transfer block is referred to as a "doubleword". An intermediate-sized transfer block is referred to as a "quadword".

FIG. 3 illustrates these three types of transfer blocks. One line 300 of data can contain as many as eight quadwords. These are respectively denoted as QW0, QW1, QW2, . . . , QW7 in FIG. 3 and respectively indicated at 310, 320, 330 and continued up to 380.

Using QW0 as an example, each quadword consists of two doublewords, DW1 and DW2. These are respectively shown at 311 and 312.

Using doubleword DW1 as an example, each doubleword is divided into a data section and an error section. The data section consists of eight 9-bit wide data-segments and five bits of error correction code (ECC). The eight data-segments of doubleword DW1 are respectively referenced in FIG. 3 as BP0, BP1, . . . , BP7 ("BP" stands for Byte Plus Parity). Each 9-bit data-segment (e.g., BP0) consists of eight data bits and one parity bit covering the segment. The 5-bit wide error correction code field of DW1 is referenced as ECC1. ECC1 is used for performing automatic correction on any single bit error in the data section of doubleword DW1 and for detecting, but not correcting, other errors.

The error section of doubleword DW1 comprises a 1-bit "mainstore uncorrectable error" field (MUR1) for indicating that there is an error within the data section of DW1 which is not self-correctable by the ECC1 field and that the error originated within or on the way from mainstore to the SDS.

Additionally, the error section contains a 1-bit wide "Data-In-Error" field (DIE1) which is used to indicate that either an uncorrectable error is associated with doubleword DW1 or a control error is associated with that doubleword. Moreover, a further parity bit (PAR1) is included to represent the parity of the error section of doubleword DW1.

Second doubleword DW2 (312) has the same structure. Its individual data segments are respectively denoted as BP0', BP1', . . . , BP7'. Its ECC field and error section fields are respectively denoted as ECC2, MUR2, DIE2, and PAR2.

Figure 4C:
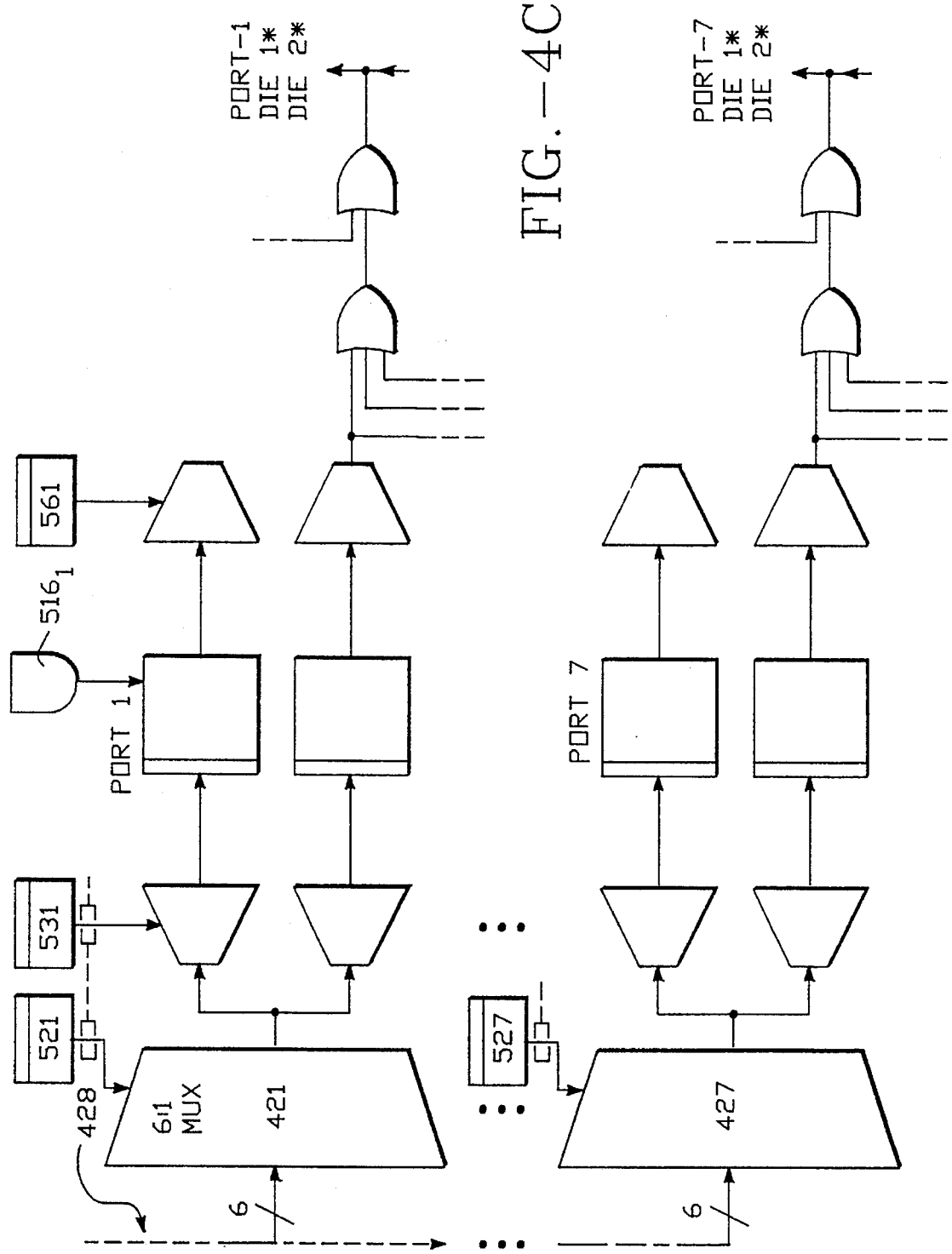

FIGS. 4A–4C illustrate a particular embodiment 400 of the invention as incorporated within an SDS 110 that processes the transfer of quadwords (e.g., 310) one at a time from a given set of sources to a given set of destinations. FIGS. 4A–4C join together as shown by the key at the bottom right corner of FIG. 4A.

Input data enters the left side of SDS 110 from a variety of sources, including the PU's 131–134, the local MSU 141, the remote MSU 141*, the remote SDS 110* (which is located in the second side 102 of the computer when the computer is double-sided), the IOP's 151–152, the XSU 142 and the SVP 160.

The received data is phase-aligned within the SDS 110 to a local version of the system clock (CLK) by a set of resynchronization registers 413a–413l, as shown.

Additionally, the SDS 110 includes a "move out queue" (MOQ) 490 (see FIG. 4B), which is used for temporarily storing data that is waiting to be moved out of the SDS to main storage (e.g., to one of MSU's 141 and 141*). The MOQ 490 temporarily stores up to 32 lines of data. This temporarily stored data is destined either for one of the main storage units (141 or 141*) or for passage back through the data-load side of the SDS (through move-out register MOR 413m) and subsequent transfer to another destination. The move-out queue 490 serves as a buffer for large blocks of data being transferred into main storage (141 or 141*). When the SC 180 receives a request for data that is still within the MOQ 490, rather than waiting for the data to move out into main storage and then retrieving it again from main storage, the SC 180 routes a copy of the requested data through move-out register (MOR) 413m so that the data can be more quickly transferred to a designated destination. Register 413m serves as a resynchronization point for data circulating out of the MOQ 490 on its way to a designated destination.

As data signals move further downstream within the SDS 110, from the resynchronization registers 413a–413l and/or the MOR 413m, towards a next-described set of eight multiplexers 420–427, the integrity of each data signal is checked by one or more error detectors. Included among these detectors are parity checkers 414a, 414f, 414g, 414h, 414n and ECC units 414e, 414l and 414m. (It is to be understood that each data source has its own set of parity and/or ECC detectors. Only a few are shown for the sake of illustrative clarity.) All error detectors 414a –414n report to the error history tree (EHT) 215. Datawords passing through the parity checkers 414a, 414f–h, and 414n are phase aligned to one another. (This means that error reports develop simultaneously out of Py checkers which have error-infected words simultaneously passing through them.)

Parity checker 414a checks the integrity of data signals moving downstream out of registers 413a –413d. Checker 414a issues a separate error indication for an error condition in the data of each separate data source. Register 413a receives its data from PU 131 over data bus section 111a. Register 413b receives its data from PU 132 over data bus section 115a. Register 413c receives its data from PU 133 over data bus section 117a. Register 413d receives its data from PU 134 over data bus section 120a.

The SDS 110 is designed such that it can route incoming data from a limited number of PU's at a time (e.g., two at a time). A first control word (CW1) is transmitted from the SC 180 by way of a system clocked latch 510 to a four-to-one (4:1) multiplexer 416. This control word (CW1) selects one of the four incoming processor unit data flows and multiplexer 416 responsively outputs the selected flow as a processor unit data-in signal PUDI which is next applied to a six-to-one (6:1) multiplexer 420. The PUDI signal is further distributed by bus 428 (shown as a dashed, downward-pointing line) to seven additional 6:1 multiplexers, 421–427 (shown in FIG. 4C). Each of multiplexers 421–427 receives the same data inflow signals as does multiplexer 420, but each has their own multiplexer control latch (521–527) for storing a respective source-identifying control word (CW2). The four input buses of multiplexer 416 also connect to four input ports of multiplexer 418 so that two PU inflows can be processed at the same time.

Multiplexer 420 receives two further data flows, MS0 and MS1, respectively, from MSU 141 and MSU 141*.

Multiplexer 420 additionally receives a remote data in RMDI signal from register 413g. The received signal passes through error detector 414g.

Multiplexer 420 further receives an extra data-input signal (XUDI). This signal (XUDI) comes from one of registers 413a -413d and 413h–413l by way of an eight-to-one (8:1) multiplexer 418. Multiplexer 418 is controlled by a further control word (not shown) provided from SC 180.

Multiplexer 420 further receives a move-out data input signal (MODI) from the move-out queue register (MOR) 413m.

Control register 520 receives a load source identification value (CW2) from SC 180. Element 512 represents part of an error detection unit (514, FIG. 4B) coupled across the output of CW2 register 520.

Element 511 represents a further portion of the error detection unit which is coupled across the output of CW1 register 510.

Referring to FIG. 4B, elements 510, 520, 511, 512 and 420 are redrawn in dashed lines in order to facilitate the understanding of the section shown in FIG. 4B.

Error detector 514 is coupled to detect error conditions at already-described positions 511 and 512, as well as at the outputs of next-described control-word registers 530 and 540. Error detector 515 is coupled to detect error conditions at intermediate outputs of another control word register 550. Error detector 518 is coupled to detect error conditions at the outputs of additional control word registers 560, 570 and 580.

Multiplexer 420 is referred to as the port-0 source-selecting multiplexer. Multiplexers 421–427 (FIG. 4C) are respectively referred to as the port-1 through port-7 source-selecting multiplexers. Each of the eight data-transfer ports of SDS 110 has substantially the same structure. The following description of data-transfer port-0 should suffice for understanding the structure of the remaining data-transfer ports.

The output of source-identifying multiplexer 420 splits off to two multiplexers 430a and 430b. Multiplexer 430a receives the data section of doublewords transmitted through multiplexer 420. Multiplexer 430b receives the error sections of doublewords transferred through multiplexer 420. Each of multiplexers 430a and 430b is a one-to-eight (1:8) load-position selecting device which selects one of eight possible storage locations in a next following port-0 data-storing buffer 440. The data-storing port-0 buffer 440 is divided into a data section storing portion 440a and an error-section storing portion 440b.

When a block of data (e.g., a doubleword 311 or a quadword 310 or a line 300) is transferred through multiplexer 420, one or a series of quadword-identifying codes determines the positions within the port-0 storage buffer 440 where the data and error sections of each transfer block will be stored. These QW-ID control words pass from system controller (SC) 180 through CW3 register 530 and through a bank of load-valid masking AND gates 513 (represented as one gate) to multiplexers 430a and 430b. A "load-valid" signal (CW4) passes from SC 180 through register 540 to drive AND bank 513 and a further bank of AND gates $516_0$–$516_7$ (only $516_0$ is shown in FIG. 4B).

As seen, port-0 buffer section 440a has eight storage positions respectively labelled QWD0 through QWD7 for storing the data sections of as many as eight quadwords sent to it from multiplexer 430a. Similarly, portion 440b has eight data storage areas for storing the error sections (labelled QWE0-QWE7) sent to it from multiplexer 430b. When a "load valid" signal (CW4) is sent in conjunction with a load port-identification signal (CW5) designating data-transfer port-0, quadword data passing through multiplexer 420 is loaded into an appropriate slot of the port-0 storage buffer 440 in accordance with the QW-ID control word (CW3) then applied to multiplexers 430a and 430b. The load port-identification signal (CW5) moves from the SC 180 through register 550 and masking gates $516_0$–$516_7$ to respective port data storage buffers 440–447 (only one port shown in FIG. 4B).

After data is routed through the source-selecting multiplexers 420–427 of the data-transfer ports, as dictated by a SRC-ID control word $CW_2$ respectively applied to each of the ports, and after quadwords are sequentially loaded into port buffers 440–447 in accordance with load-control signals CW3–CW5, the data may be unloaded from the port buffers 440–447 and routed to desired destinations in accordance with data unload control words, CW6–CW8.

The outputs of the port-0 storage buffer 440 move out of the SDS 110 by passing through multiplexers 450a and 450b in accordance with an unload control sequence supplied from SC 180 through clocked register 560. Each of multiplexers 450a and 450b is an eight-to-one (8:1) multiplexer.

Multiplexers 450e and 450f are used for independently transferring data from the port-0 storage buffer 440 to the move-out queue (MOQ) 490. A separate control word CW6' supplied from register 566 controls the unload sequence for MOQ data. Thus, MOQ data can be unloaded from different parts and/or in a different sequence out of the port-0 storage buffer 440 at the same time that data is being unloaded to other destinations.

Multiplexer 450a moves data out from data section storing portion 440a to a bank of six eight-to-one (8:1) multiplexers 460a–460e. The data output from multiplexer 450a is labelled as the port-0 unload data (PRT-0 UNLD). Each of multiplexers 460a–460e receives similar data inputs from ports PRT-1 through PRT-7. Each of multiplexers 460a–460e receives a separate port-selecting control word. (CW7) from register 570 instructing it to unload data from a specified port to a corresponding unload destination.

There are six basic destinations for data unloaded out of SDS 110. They are respectively defined as $PU_1$, $PU_2$, $PU_3$, $PU_4$, XUDO and MOQDO. The last destination output MOQDO circulates back from multiplexer 460f to the move-out-queue (MOQ) 490. The XUDO signal from multiplexer 460e travels through a further multiplexer (not shown) and it is there directed to data units: IOP 151, IOP 152, XSU 142, and SVP 160.

Like the data section signals, the error section signals output from multiplexer 450b eventually pass through a series of eight-to-one (8:1) multiplexers 480a–480e which carry the respective signals to the unload destinations. The DIE and PAR bits, however, pass through revising gates 461–467 before moving out through multiplexers 480a–480e.

A first input line 461a of OR gate 461 receives the DIE1 bit from multiplexer 450b. (When this bit is at logic one, it indicates an error condition in doubleword number one.) The DIE2 bit goes to a similar input line 462a of OR gate 462. (When this bit is at logic one, it indicates an error condition in doubleword number two.)

A second input line 461b of OR gate 461 receives a port-0 (doubleword-one) load-error signal from 3:1 multiplexer 450c. A second input line 462b of OR gate 462 similarly receives a port-0 (doubleword-two) load error signal from 3:1 multiplexer 450d (partially shown).

A third input line 461c of OR gate 461 receives an all-ports (doubleword-one) load-error signal from a portion 471d of a port-0 (doubleword-one) error register 471. A third input line 462c of OR gate 462 similarly receives an all-ports (doubleword-two) load-error signal from a portion 472d (not shown) of a port-0 (doubleword-two) error register 472. It is to be understood that register 472 has the same structure as register 471.

The output of OR gate 461 drives a first input terminal 463a of OR gate 463. Similarly, the output of OR gate 462 drives a first input line 464a of OR gate 464. Error detector 518 drives the second input lines (463b and 464b) of respective OR gates 463 and 464. The output of OR gate 463 is referenced as the revised data-in-error bit, DIEi*. The output of OR gate 464 is referenced as DIE2*.

Referring next to the below Table 1 and Table 2, the operations of error detectors 514, 515 and 518 will be described.

TABLE 1

| SOURCE | Load OW-Id Valid PU-Id Py2 | Load PORT-Id + Py1 |
|---|---|---|
| PUDI | 3 1 2 1 | 3 1 |
| RMDI | 3 1 2 1 | 3 1 |
|  | PUER |  |
| XUDI | 3 1 3 1 | 3 1 |
| MS0 | 3 1 — 1 | 3 1 |
| MS1 | 3 1 — 1 | 3 1 |
|  | MSER |  |

TABLE 1-continued

| SOURCE | Load OW-Id Valid PU-Id Py2 | Load PORT-Id + Py1 |
|---|---|---|
| MOQ | 3 1 — 1 | 3 1 |
| RMDI | 3 1 2 1 | 3 1 |
|  | MOER | PILER |

TABLE 2

| DESTINATION | Unload OW-ID Valid | | Unload PORT-Id + Py1 | |
|---|---|---|---|---|
| PU#1 | 3 | 1 | 3 | 1 |
| PU#2 | 3 | 1 | 3 | 1 |
| PU#3 | 3 | 1 | 3 | 1 |
| PU#4 | 3 | 1 | 3 | 1 |
| XUDO | 3 | 1 | 3 | 1 |
| MODO | 3 | 1 | 3 | 1 |

Error detector 514 generates three basic kinds of error signals. They are respectively referenced as a (1) a processor-unit load-error (PUER), (2) a mainstore/miscellaneous load-error (MSER), and (3) a move-out-queue load-error (MOER). They are subdivided into error signals belonging to either doubleword-one (for example, PUER1 represents an error in a DW1 sourced from a PU) or to doubleword-two (for example, MSER2 represents an error in a DW2 sourced from one of the miscellaneous sources). Each subdivided error signal is routed with its corresponding load port-identification (CW5) to the port which is expected to receive the corresponding doubleword.

Error detector 515 outputs an error signal PILER which is distributed to all ports (port-0 through port-7). The acronym PILER stands for Port Identification Load Error. The Load Port-ID is initially 3-bits wide as it moves from SC 180 to register 550. After being latched at the input of unit 550, the Load Port-ID signal is then decoded within unit 550 into eight individual port-load commands (PRT0-LD, PRT1-LD, ..., PRT7-LD). A parity bit (Py1, see Table 1) accompanies the three pre-decode port identifying bits. The pre-decode Port-ID bits are deemed valid only when the load-valid bit (CW4) goes high. Error detector 515 tests for proper parity in the three Load Port-ID bits before they are decoded into eight individual signals. The PILER signal becomes active only if the load valid signal (CW4) is active and a parity error is detected in the bits entering unit 550.

A PUER error signal can become active when an error is detected in data being loaded either from a local processor unit or a processor unit in the remote side (102). Referring more specifically to Table 1, the loading of data from a processor unit (PU) to the storage buffer (e.g., 440) of a particular data transfer port is regulated by the following signals: PU-identification (2 bits total moving through CW1 register 510), the load quadword identification (CW3, 3 bits), the load valid signal (CW4, 1 bit) and an accompanying parity bit (Py2). The PUER signal goes to logic one ("1") if there is a parity error in the combination of these seven bits (underlined in Table 1) as received either from PUDI multiplexer 416 or from remote SDS 110*. Optionally, CW2 may also be included in the bits that are checked for correctness by signal PUER.

The MSER signal indicates if there is an error in the control words which regulate data routed form the mainstore unit or external units. MSER collectively covers errors in CW3, CW4, and optionally CW2, for data sourced from either MS0 or MS1 or XUDI. The three control word bits (CW1) driving multiplexer 418 are not covered by MSER when the source is MS0 or MS1 because the control bits only relate to transfers through multiplexer 418.

Similarly, the MOER signal checks for errors in control words which regulate the transfer of data from the local move-out queue or the remote MOQ 490* (received through RMDI). Note that a RMDI Py2 group error sets both the PUER and MOER error signals. This is done because data from the remote SDS 110* may have come from one of the remote processor units or from the remote move-out queue.

Port-0 can receive load data from any of the six possible sources (PUDI, MS0, MS1, RMDI, XUDI, MODI). A priority mechanism within the port (not shown) assigns priorities to these sources and accepts the data only from the highest priority source. A port-0 priority signal, which is derived from the priority mechanism, is applied to the three-to-one multiplexer 450c (and also to multiplexers 450d and 450g). This priority signal defines generally whether the accepted data signal belongs to the PUER, MSER, or MOER group of Table 1. If the corresponding one of error signals PUER, MSER, and MOER goes high during the transfer of a corresponding doubleword, it sets a corresponding one of error register latches 471a, 471b or 471c. The latched error signal is then passed through multiplexer 450c to input lines 461b or 462b of OR gate 461 or 462 if the error involves the highest priority source for that port.

If there is an error in the three bits which enter port-identification control latch 550 while the load-valid signal (CW4) is active, then it is not known whether the most recently loaded data overwrote data in some other port. The data in all ports must be considered error-infected. Accordingly, the PILER error signal sets an error latch in each of all eight ports. The corresponding latch in the port-0 error register is referenced as 471d.

Just before data transfer through a single port is to begin, a local reset signal (e.g., port-0 reset) is applied to the port error register (e.g., 471) to clear out its error-indicating latches (471a –471d ). The reset signal comes from the SC 186 together with a port identification signal. If detector 515 determines that the port identification was in error, the PILER signal goes high again and sets the corresponding doubleword latch 471d (or 472d, not shown) to indicate that the reset signal may have been applied to the wrong port.

Of importance, if the MSER signal goes high while data is being transferred through port-0, but the datawords transferring through port-0 come from the PU's, the MSER error is not associated with the data load from the PU. Only an PUER error would be associated with such datawords. Multiplexer 450c is responsible for associating appropriate control word error indications with datawords being loaded from the corresponding data source.

For data unload operations, the regulating control words are those passing through CW6 register 560, CW7 register 570 and an unload valid register 580. The SC 180 sends an unload valid signal through register 580 to indicate that the unload quadword ID output by register 560 and the unload port-identification output by register 570 are valid. An error in the bits output by registers 560, 570 or 580 is picked up by error detector 518 and tacked into the DIE* bit positions by respective OR gates 463 and 464. Table 2 shows the number of bits involved in these operations for each unload destination.

FIG. 4B is drawn mostly to show how the DIE1 is flipped when a control error corresponding to doubleword-1 is detected within port-0. Error register 472 handles doubleword-2 errors in combination with multiplexer 450*d* and OR gates 462 and 464.

There is a completely separate plane for flipping the DIE bits of datawords which unload to the move-out queue 490. Multiplexer 450*f* is controlled independently of multiplexer 450*b* (just as multiplexer 450*e* is controlled independently of 450*a*). The output of multiplexer 450*f* moves to a parallel error-handling circuit (not shown, but similar to 461–467) and the revised doubleword error sections then move through multiplexer 480*f* into the MOQ 490. A dual set of multiplexers indicated at 450*g* operate in similar fashion to multiplexers 450*c* and 450*d* for prioritizing error flag settings for doublewords (one and two) whose destination is the MOQ 490.

The revised DIE* bits which belong to data whose destination is outside of the SDS 110 move through respective multiplexers 480*a* –480*e* in conjunction with their corresponding data sections which move through multiplexers 460*a* –460*e*.

There is one additional item which should be mentioned. When a DIE bit is flipped, the parity for the corresponding doubleword should be correspondingly flipped. As seen in FIG. 4B, exclusive-OR gate 465 detects a difference between the DIE1 bit and the revised DIE1* bit. The output of XOR gate 465 feeds one input of second XOR gate 467. The other input of second XOR gate 467 receives the doubleword-1 parity bit, PAR1. The output of second XOR gate 467 becomes the revised parity bit PAR1* which is fed back to the destinations through multiplexers 480*a* –480*e*. When the DIE bit is flipped, the corresponding parity bit is also flipped. While not shown, it is to be understood that a similar circuit is provided for handling the doubleword-2 parity bit, PAR2. It is also to be understood that the same circuity is repeated for the move-out queue error-handling plane (not shown). Moreover, it is to be understood that truth-table techniques may be used for formulating circuits which operate similarly to that formed by gates 461–467.

The above disclosure is to be taken as illustrative of the invention, not as limiting its scope or spirit. Numerous modifications and variations will become apparent to those skilled in the art after studying the above disclosure.

Given the above disclosure of general concepts and specific embodiments, the scope of protection sought is to be defined by the following claims.

What is claimed is:

1. An apparatus for tagging a control error indication onto a data signal passing through a data router, the router having a data signal processing section and a control signal processing section coupled to the data signal processing section, said apparatus comprising:

control error detecting means for detecting an error condition in a control signal passing through the control signal processing section of the router;

control error associating means for associating each data signal passing through the data signal processing section with one or more of the control signals passing through the control signal processing section; and error indication means, coupled to the control error detecting means and to the control error associating means and to the data signal processing section, for setting an error indication in each data signal passing through the data signal processing section which has one or more associated control signals infected by error.

2. An error tagging apparatus according to claim 1 wherein:

the data signal processing section of the router includes a plurality of data buses each for receiving data from a corresponding data source and/or for transmitting data to a corresponding data receiver.

3. An error tagging apparatus according to claim 2 wherein:

the data signal processing section of the router is operatively coupled to the control signal processing section by an interconnect bus that carries control signals passing through and out of the control signal processing section; and the control error detecting means includes a first error detector for detecting first error conditions in first control signals entering the data signal processing section from the interconnect bus, the first error detector being operatively coupled to the error indication means for setting the error indication of each data signal passing through the data signal processing section which has one or more associated first control signals infected by error.

4. An error tagging apparatus according to claim 3 wherein:

the data signal processing section of the router is operatively coupled to an independent service-processor by a scan bus;

the first error detector reports detected errors to an error history tree circuit; and the error history tree circuit forwards the error reports to the service-processor by way of the scan bus.

5. An error tagging apparatus according to claim 3 wherein:

the data signal processing section of the router includes a plurality of data-storing buffers for temporarily storing data that is being transferred from a data sourcing device to a data requesting device;

the data signal processing section of the router includes source data routing means for routing data from each of a plurality of data sources to corresponding ones of the data-storing buffers;

the source data routing means is responsive to second control signals entering the data signal processing section from the interconnect bus to define the corresponding data-storing buffers for data received from said plurality of data sources; and the control error detecting means includes a second error detector for detecting second error conditions in the second control signals entering the data signal processing section from the interconnect bus, the second error detector being operatively coupled to the error indication means for setting the error indication of each data signal passing through the data signal processing section which has one or more associated second control signals infected by error.

6. An error tagging apparatus according to claim 5 wherein:

the data signal processing section of the router includes destination data routing means for routing data to each of a plurality of data destinations from corresponding ones of the data-storing buffers;

the destination data routing means is responsive to third control signals entering the data signal processing section from the interconnect bus to define the corresponding data-storing buffers from which data is to be output to respective ones of said plurality of data destinations; and the control error detecting means includes a third error detector for detecting third error conditions in the third control signals entering the data signal processing section from the interconnect bus, the third error detector being operatively coupled to the error indication means for setting the error indication of each data signal passing through the data signal processing section which has one or more associated third control signals infected by error.

7. An error tagging apparatus according to claim 2 wherein:

the data signal processing section of the router is operatively coupled by said plurality of data buses to respective ones of at least, a main storage unit and a plurality of data processor units.

8. An error tagging apparatus according to claim 7 wherein:

the control signal processing section of the router is operatively coupled by a plurality of access-request control lines to respective ones of the main storage unit and the plurality of data processor units, said access-request control lines carrying respective requests for access between the control signal processing section and corresponding ones of the main storage unit and the plurality of data processor units.

9. An error tagging apparatus according to claim 8 wherein:

the control signal processing section of the router is further operatively coupled by a plurality of status valid control lines to respective ones of the data processor units, said status valid control lines carrying respective acknowledgements of successful completion of requested data accesses from the control signal processing section to the corresponding data processor units.

10. A method for tagging a control error indication onto a data signal passing through a data router, the method comprising the steps of:

detecting an error condition in a control signal of the router;

associating each data signal with one or more control signals; and setting an error indication in each data signal having an associated control signal which is infected by error.

11. A machine-implemented method of indicating to a data receiver that a received digital dataword is of questionable validity either due to a first error in the generation or transmission of bits of the received digital dataword or due to a second error in the generation or transmission of one or more control words that control the generation or transmission of the received digital dataword; said method comprising the steps of, prior to the transmission of the received digital dataword to the data receiver:

(a) including an error-indicating bit in the received digital dataword for simultaneous transmission along with other bits of the received digital dataword to the data receiver;

(b) setting the error-indicating bit to an error-indicating state upon detection of said first error in the sourcing or transmission of the other bits of the received digital dataword; and (c) setting the error-indicating bit to said error-indicating state upon detection of said second error in the sourcing or transmission of one or more control words that control the sourcing or transmission of the received digital dataword.

12. An error detecting apparatus for use in a multiport data router that simultaneously routes data between a plurality of data requestors and a plurality of data providers, said apparatus comprising:

(a) a plurality of error detectors disposed among control signal paths of the data router, the detectors being provided for detecting error conditions in control signals carried by said control signal paths;

(b) tag means for tagging on an indication of a control error condition onto each item of data passing through the router in the case where a corresponding one or more of the control signal paths is found by said plurality of error detectors to be infected with error while the control signal paths are carrying control parameters for routing said data; and (c) error-infection extent-defining means for defining which items of data will or will not be tagged with an error indication.

13. An error detecting method for use in a multi-port data router that simultaneously routes data between a plurality of data requestors and a plurality of data providers, said method comprising the steps of:

(a) providing a plurality of error detectors disposed among control signal paths of a data router for detecting error conditions in control signals carried by such paths;

(b) identifying which items of data passing through the router are or are not to be tagged as error-infected when an error condition is detected; and (c) tagging each identified data item with an indication of a control error condition as the identified data item passes through the router.

14. In a data routing system for routing data signals from control-designated ones of plural devices to control-designated others of the plural devices, said data routing system having a data transfer section for transferring in-route data signals and a control processing section for receiving and processing data requests from data-requesting ones of the plural devices and for producing control signals for managing the data transfer section, an apparatus for tagging control error indications onto in-route data signals passing through the data transfer section, said apparatus comprising:

(a) control error detecting means for detecting error conditions in control signals within the control processing section;

(b) control error associating means for associating each data signal passing through the data transfer section with one or more of the control signals within the control processing section; and (c) error indication means, coupled to the control error detecting means and to the control error associating means and to the data transfer section, for setting an error indication in each data signal passing through the data transfer section which has one or more associated control signals infected by error.

* * * * *